(12) United States Patent
Nakagawa

(10) Patent No.: US 8,027,180 B2  
(45) Date of Patent: Sep. 27, 2011

(54) POWER GENERATING APPARATUS

(75) Inventor: Masanori Nakagawa, Numazu (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 425 days.

(21) Appl. No.: 12/253,290

(22) Filed: Oct. 17, 2008

(65) Prior Publication Data

US 2009/0102437 A1  Apr. 23, 2009

(30) Foreign Application Priority Data

Oct. 19, 2007  (JP) .................................. 2007-272388

(51) Int. Cl.
  G05F 1/40   (2006.01)
  G05F 1/44   (2006.01)
  G05F 1/455  (2006.01)
(52) U.S. Cl. .......................................... 363/98; 363/132
(58) Field of Classification Search .................... 322/20, 322/28, 24, 46, 27, 29; 323/217, 235, 237, 323/241, 244, 271, 300, 312, 319, 219; 363/37, 363/39, 40, 41, 50, 56.01, 56.02, 97, 98, 363/131, 132

See application file for complete search history.

(56) References Cited

U.S. PATENT DOCUMENTS

| | | | |
|---|---|---|---|
| 6,373,729 B1 * | 4/2002 | Shimazaki et al. | 363/37 |
| 6,940,259 B2 * | 9/2005 | Suzuki et al. | 322/20 |
| 7,081,738 B2 * | 7/2006 | Muramatsu et al. | 322/24 |
| 7,157,885 B2 * | 1/2007 | Nakagawa et al. | 322/28 |
| 7,245,036 B2 * | 7/2007 | Endou et al. | 290/40 A |
| 2008/0067981 A1 * | 3/2008 | Inaba et al. | 322/20 |

FOREIGN PATENT DOCUMENTS

| | | |
|---|---|---|
| JP | 11046456 | 2/1999 |
| JP | 2004173482 | 6/2004 |

* cited by examiner

Primary Examiner — Gary L Laxton  
Assistant Examiner — Nusrat Quddus  
(74) Attorney, Agent, or Firm — Pearne & Gordon LLP

(57) ABSTRACT

A power generating apparatus including an AC generator that supplies electric power to a load including a voltage accumulating means, an inverter that applies AC control voltage to armature winding of the generator from the voltage accumulating means, and a controller that controls a phase of control voltage applied to the armature winding by the inverter to keep load voltage at a target value, wherein the phase of the control voltage is controlled so as to advance when the load voltage is higher than the target value, hold the present phase when the load voltage is equal to the target value, advance when the load voltage is lower than the target value and a phase of phase voltage of the generator is delayed behind a phase of a phase current of the same phase, and delay when the load voltage is lower than the target value and the phase of the phase voltage of the generator is advanced ahead of a phase of a phase current of the same phase.

20 Claims, 8 Drawing Sheets

POWER GENERATING APPARATUS

TECHNICAL FIELD OF THE INVENTION

The present invention relates to a power generating apparatus that drives a load with a rectified output of an AC generator.

PRIOR ART OF THE INVENTION

When a load is driven by a rectified output of an AC generator, it is necessary to control an output of the generator to bring the voltage across the load (load voltage) close to a target value. For example, when a battery is charged by the rectified output of the AC generator, the output of the generator is controlled to keep the voltage across the battery near a target value equivalent to a control value set to prevent the battery from being overcharged.

When the generator has a magnetic field winding, it is possible to control the output of the generator by controlling a magnetic field current. However, when the generator is a magnet type AC generator, since a magnetic field is formed by a permanent magnet, it is impossible to control a power generation output with a method same as that in controlling the generator having the magnetic field winding.

Therefore, the applicant earlier proposed, as disclosed in Japanese Patent Application Laid-Open Publication No. 11-046456, a power generating apparatus adapted to provide, when voltage accumulating means (a battery or a capacitor) charged by a rectified output of a generator is provided on a load side of a generator, a voltage source inverter of a bridge type between an armature winding of a magnet type AC generator and a load and apply control voltage having a predetermined phase angle to the armature winding from the voltage accumulating means through the inverter to thereby perform control to bring load voltage to a target value.

The voltage accumulating means charged by a rectified output of the generator includes voltage accumulating means such as a capacitor connected in parallel to a load connected between output terminals of a rectifying circuit that rectifies an output of the generator or a capacitor connected between the output terminals of the rectifying circuit as a load.

In the power generating apparatus proposed by the applicant earlier, AC voltage induced in the armature winding is applied to the voltage accumulating means through a rectifying circuit comprised of a feedback diode in the inverter to charge the voltage accumulating means. The inverter is controlled by the controller, voltage across the voltage accumulating means is converted into AC control voltage, a frequency of which is equal to an output frequency of the generator and which has a predetermined phase angle with respect to a reference phase, and the control voltage is applied to the armature winding of the generator, whereby electric energy supplied from the generator to the load is controlled to bring the load voltage close to the target value. As the reference phase, for example, it is used a phase of a magnetic flux waveform indicating a change in a magnetic flux linked with the armature winding or a phase of no-load induced voltage of the generator logically calculated from a mechanical construction of the generator.

In the AC generator, when the phase of the magnetic flux waveform indicating a change in a magnetic flux linked with the armature winding or the phase of no-load induced voltage of the generator logically calculated from the mechanical construction of the generator is set as a reference phase and AC control voltage, a frequency of which is equal to that of the induced voltage of the armature winding and which is delayed in phase behind the reference phase, is applied to the armature winding, usually, it is possible to increase magnetic fluxes linked with the armature winding and increase an output of the generator. When control voltage advanced in phase ahead of the reference phase is applied to the armature winding, usually, it is possible to reduce magnetic fluxes linked with the armature winding and reduce an output of the generator.

When the control described above is performed, it is possible to perform the control for bringing the load voltage close to the target value by changing a phase of the control voltage to an advanced side or a delayed side with respect to the reference phase according to whether the load voltage is higher or lower than the target value.

For example, when the battery is charged by a rectified output of the AC generator, since it is possible to increase an output of the generator to increase a charging current of the battery by delaying a phase of the control voltage when the voltage across the battery is lower than the target value and reduce the output of the generator to reduce the charging current by advancing the phase of the control voltage when the voltage across the battery is higher than the target value, it is possible to control the output of the generator to keep charging voltage of the battery near the target value.

However, it is not always possible to increase the output of the generator if the phase of the control voltage with reference to the reference phase is delayed. If the phase of the control voltage is excessively delayed, the output of the generator may decrease.

For example, when the charging of the battery is controlled as described above, it is assumed that, at fixed rotational speed, the control system is balanced in a state that the phase of the control voltage is delayed by a fixed angle with respect to a phase of a phase current. If the load connected to the battery increases in this state by decrease of the impedance of the load and the charging voltage of the battery (the voltage across the battery) falls, the controller controls the inverter to further delay the phase of the control voltage to thereby increase the charging current and attempt to keep the charging voltage of the battery at the target value. When the charging voltage of the battery still does not increase to the target value even if the phase of the control voltage is delayed in this way, the controller attempts to further delay the phase of the control voltage. However, if the phase of the control voltage is excessively delayed, a power generation output will fall according to the delay in the phase of the control voltage and the capability of the generator cannot be utilized to the maximum.

When the load requires electric power exceeding the capability of the generator in a state where the generator is operated at certain rotational speed, it is unavoidable that the load voltage falls below the target value but, even in this case, it is preferable to give as much electric power as possible to the load as long as the power generation capability allows.

Therefore, in a power generating apparatus disclosed in Japanese Patent Application Laid-Open Publication No. 2004-173482, there is provided means for observing a load current immediately before a delayed control voltage is applied to an armature winding and the load current immediately after the control voltage is applied and, when the load current decreases regardless of the fact that a phase of the control voltage is delayed, judging that the phase of the control voltage is delayed behind a delay phase for maximizing a power generation output (a limit delay phase), and control for maintaining a state where a maximum load current can be fed to the extent allowed by generation capability of the generator is performed by advancing the phase of the control voltage, when it is judged that the phase of the control voltage is delayed behind the limit delay phase.

It is conceivable to calculate in advance, as a limit delay phase, a phase of the control voltage that can maximize an output of the generator in a state where the generator is operated at certain rotational speed and limit a delay amount of the phase of the control voltage to prevent the phase of the control voltage from being further delayed than the limit delay phase. Japanese Patent Application Laid-Open Publication No. 2004-173482 discloses that a map for a limit delay phase arithmetical operation for giving a relation between rotational speed of a generator and a limit delay phase of control voltage is stored in a memory of a microprocessor in advance, a limit delay phase of the control voltage is calculated by searching through this map, a phase of the control voltage is controlled not to be further delayed than the limit delay phase calculated from the map.

However, the load current does not increase and decrease depending on only the phase of the control voltage but increases and decreases as well when the impedance of the load connected to the outside of the generator changes. Therefore, as disclosed in Japanese Patent Application Laid-Open Publication No. 2004-173482, when the power generating apparatus is adapted to observe a load current immediately before the control voltage is applied to the armature winding and the load current immediately after the control voltage is applied and, when the load current decreases regardless of the fact that the phase of the control voltage is delayed, judge that the phase of the control voltage is delayed behind the limit delay phase, it is likely that it is judged by mistake that the phase of the control voltage exceeds the limit delay phase when the load current decreases because of, for example, an increase in load impedance and it is likely that the control of an output of the generator cannot be accurately performed.

Since the phase of the control voltage for maximizing a power generation output in each rotational speed changes according to, for example, winding temperature of the generator and the temperature of a semiconductor element comprising the inverter, it is necessary to correct the limit delay phase of the control voltage, which is calculated by searching through the map for limit delay phase arithmetical operation, with respect to parameters such as the winding temperature of the generator and the temperature of the semiconductor element comprising the inverter.

Therefore, when the phase of the control voltage is controlled not to be further delayed than the limit delay phase calculated from the map for limit delay phase arithmetical operation as disclosed in Japanese Patent Application Laid-Open Publication 2004-173482, it is necessary to store an extremely large number of control data in a memory of a microprocessor comprising the controller in advance and, more over, since a computational amount increases and a load imposed on the microprocessor increases, it is necessary to use a high-performance microprocessor as the microprocessor.

In the power generating apparatus disclosed in Japanese Patent Application Laid-Open Publication No. 2004-173482, since it is necessary not only to store a large number of data forming the map for limit delay phase arithmetical operation in the memory of the controller but also to store a peculiar parameter every time a specification or an application of the generator is varied, there is a problem in that the controller lacks general versatility. When the controller lacks general versatility, since mass-productivity of the power generating apparatus is deteriorated, an increase in cost of the power generating apparatus is inevitable because it is necessary to use the high-performance microprocessor.

If a range of the winding temperature of the generator can be predicted from a purpose of use of the power generating apparatus and the winding temperature is within the predicted temperature range, it is conceivable to set the limit delay phase as a fixed value on an advance side with a sufficient margin given thereto such that the phase of the control voltage is not delayed behind the limit delay phase no matter what value the winding temperature takes. However, in such a case, the apparatus can have a problem that the capability of the generator cannot be sufficiently utilized.

SUMMARY OF THE INVENTION

An object of the present invention is to provide a power generating apparatus that is adapted to be capable of giving general versatility to a controller by eliminating the necessity for storing a map for arithmetically operating a limit delay phase of control voltage and parameters peculiar to a generator in a memory, accurately and easily performing control for bringing load voltage close to a target value, and highly accurately performing control of a power generation output even if a high-performance microprocessor is not used.

According to the present invention, there is provided a power generating apparatus including an AC generator that has an n-phase (n is an integer equal to or larger than 1) armature winding, an n-phase voltage source inverter that includes n-phase bridge-connected switch elements and feedback diodes antiparallel-connected to the respective switch elements, AC terminal sides of which are connected to output terminals of the AC generator, and in which a load and voltage accumulating means are connected in parallel between DC side terminals, and a controller that controls the inverter to invert voltage across the voltage accumulating means into control voltage of an AC waveform that has a frequency equal to that of the output voltage of the AC generator and has a predetermined phase angle with respect to a reference phase set in advance and apply the control voltage to the armature winding of the AC generator.

In the power generating apparatus according to the present invention, the controller includes the voltage accumulating means and control-voltage-phase controlling means for setting the voltage across the load as load voltage and controlling a phase of the control voltage to bring the load voltage close to a target value.

In the present invention, the controller includes voltage-phase detecting means and current-phase detecting means for detecting a phase of a phase voltage and a phase of a phase current of the AC generator, respectively. The control-voltage-phase controlling means is comprised so as to perform, control for advancing the phase of the control voltage when the load voltage is higher than the target value, holding the phase of the control voltage in the present phase when the load voltage is equal to the target value, advancing the phase of the control voltage when the load voltage is lower than the target value and the detected phase of the phase voltage is delayed behind a phase of a phase current of the same phase, and delaying the phase of the control voltage when the load voltage is lower than the target value and the detected phase of the phase voltage is advanced ahead of a phase of a phase current of the same phase in order to bring the load voltage close to the target value.

No matter what speed the AC generator is rotating or no matter what temperature the temperature of the winding of the generator and the temperature of the switch elements of the inverter is, electric power given to the load from the generator is maximized when a phase of a phase voltage coincide with a phase of a phase current of the same phase (when power factor of the load is 1). Therefore, when the load voltage is lower than the target value, the phase of the control voltage only has to be controlled to cause the phase of the phase voltage to substantially coincide with the phase of the phase current of the same phase in order to prevent a state where the capability of the generator cannot be utilized to the maximum from occurring.

Therefore, in the present invention, the control-voltage-phase controlling means is comprised so as to perform control for advancing the phase of the control voltage when the load voltage is higher than the target value, holding the phase of the control voltage in the present phase when the load voltage is equal to the target value, advancing the phase of the control voltage when the load voltage is lower than the target value and the detected phase of the phase voltage is delayed behind a phase of a phase current of the same phase, and delaying the phase of the control voltage when the load voltage is lower than the target value and the detected phase of the phase voltage is advanced ahead of a phase of a phase current of the same phase, in order to bring the load voltage close to the target value.

If such control is performed, when the load increases and the load voltage cannot reach the target value, it is possible to easily control the phase of the control voltage so as to maintain a state where maximum electric power is given to the load within capability of the generator, regardless of the rotational speed of the generator, the temperature of the armature winding, the temperature of the switch elements of the inverter, and parameters peculiar to the generator.

According to the present invention, since it is unnecessary to search through the map for giving the relation between the rotational speed of the generator and the limit delay phase of the control voltage and perform an arithmetical operation for correcting the limit delay phase of the control voltage calculated by searching through the map with respect to the temperature of the armature winding, the temperature of the switch elements of the inverter, and the like, it is possible to perform the control for bringing the load voltage close to the target voltage without performing many kinds of arithmetical processing and simplify the control.

Moreover, according to the present invention, since it is possible to reduce an arithmetical processing amount, it is possible to accurately perform the control without specifically using a high-performance microprocessor. Furthermore, since it is possible to eliminate the necessity for causing the memory of the controller to store the map for limit delay phase arithmetical operation and store parameters peculiar to the generator in use, and since it is unnecessary to use the high-performance microprocessor, it is possible to give general versatility to the controller, improve mass productivity and reduce the cost of the power generating apparatus.

In a preferred aspect of the present invention, the control-voltage-phase controlling means is comprised so as to perform control for advancing the phase of the control voltage by a first angle when the load voltage exceeds the target value, holding the phase of the control voltage in the present phase when the load voltage is equal to the target value, advancing the phase of the control voltage by a second angle when the load voltage is lower than the target value and the phase of the phase voltage is delayed behind a phase of a phase current of the same phase, and delaying the phase of the control voltage by a third angle when the load voltage is lower than the target value and the phase voltage is advanced ahead of a phase current of the same phase.

In another preferred aspect of the present invention, the controller includes voltage-phase detecting means and current-phase detecting means for detecting a phase of a phase voltage and a phase of a phase current of the AC generator, respectively, phase-difference detecting means for detecting a phase difference between a phase voltage and a phase current in the same phase from detection results by the voltage-phase detecting means and the current-phase detecting means when the load voltage is lower than the target value, and phase-difference judging means for comparing the phase difference detected by the phase-difference detecting means with a set judgment value and judging whether the detected phase difference is equal to or smaller than the judgment value. In this case, the control-voltage-phase controlling means is comprised so as to perform control for advancing the phase of the control voltage by a first angle when the load voltage exceeds the target value, holding the phase of the control voltage in the present phase when the load voltage is equal to the target value and when the load voltage is lower than the target value and the phase difference is equal to or smaller than the judgment value, advancing the phase of the control voltage by a second angle when the load voltage is lower than the target value, the phase difference exceeds the judgment value, and the phase voltage is delayed behind the phase current, and delaying the phase of the control voltage by a third angle when the load voltage is lower than the target value, the phase difference exceeds the judgment value, and the phase voltage is advanced ahead of the phase current.

When the load voltage is lower than the target value, if the phase of the control voltage is advanced or delayed immediately after it is judged whether the phase of the phase voltage is delays behind or advanced ahead of the phase of the phase current, it is likely that fine fluctuation (hunting) of a power generation output occurs, since a state where the phase of the control voltage is advanced and a state where the phase of the control voltage is delayed are alternately repeated at a short period. On the other hand, when the load voltage is less than the target value, it is judged whether the phase difference between the phase voltage and the phase current exceeds the judgment value and, the control for advancing or delaying the phase of the control voltage is performed only when the phase difference exceeds the judgment value as described above. With such a control performed, it is possible to prevent the power generation output from finely fluctuating and stably perform the control of the power generation output.

The phase difference between the phase current and the phase voltage may be represented as a time difference between timing when a zero-cross point of the phase voltage is detected and timing when a zero-cross point of the phase current is detected or may be represented as an angle between the zero-cross point of the phase voltage and the zero-cross point of the phase current. When the phase difference between the phase current and the phase voltage is represented as the time difference, even when the phase difference between the phase current and the phase voltage represented as an angle is fixed, the phase difference indicates a different value depending on rotational speed. In this case, it is preferable to determine the judgment value compared with the phase difference between the phase current and the phase voltage according to rotational speed. When the phase difference between the phase current and the phase voltage is represented as the angle, the judgment value can be a fixed value set in advance.

Although the first angle may be a fixed value, in order to quickly perform the control for bringing the load voltage close to the target value without causing overshoot, it is preferable to determine the first angle according to a deviation between the load voltage and the target value. In other words, it is preferable to set the first angle to a larger value as the deviation between the load voltage and the target value becomes larger and set the first angle to a smaller value as the deviation decreases.

The second angle may be a fixed value or may be an angle determined according to the phase difference between the phase voltage and the phase current. When the second angle is set larger as the phase difference between the phase voltage and the phase current is larger and the second angle is set smaller as the phase difference between the phase voltage and the phase current is smaller, it is possible to reduce a ripple of the load voltage and perform stable control.

Similarly, the third angle may be a fixed value or may be an angle determined according to the phase difference between the phase voltage and the phase current. When the third angle is set larger as the phase difference between the phase voltage and the phase current is larger and the third angle is set smaller as the phase difference between the phase voltage and the phase current is smaller, it is possible to reduce a ripple of the load voltage and perform stable control.

Although the present invention is useful when a magnet type AC generator that cannot perform control of a magnetic field is used as the AC generator, the present invention can be applied as well when an excitation type AC generator having a magnetic field winding is used.

The voltage-phase detecting means used in the power generating apparatus according to the present invention can be comprised so as to include phase-voltage zero-cross-point detecting means for detecting a zero-cross point of at least one phase voltage of the armature winding of the AC generator and phase-voltage phase-angle arithmetical operation means for arithmetically operating a phase angle with respect to a reference phase at the zero-cross point detected by the phase-voltage zero-cross-point detecting means and determine the arithmetically-operated phase angle as a phase angle of a phase voltage of at least one phase.

Since the reference phase is a reference in specifying a phase at the zero-cross point of the phase voltage, the reference phase may be a fixed phase arbitrarily decided. For example, it is possible to provide a hall sensor that detects polarity of magnetic poles of a rotor of the generator and outputs position detection signals of a rectangular shape indicating different levels when the detected polarity of the magnetic pole is an S pole and an N pole and a phase at a rising edge or a phase of a falling edge of the rectangular wave signal outputted by the hall sensor can be used as a reference phase. It is also possible to provide a pulse signal generator that generates a pulse signal at a certain rotation angle position of the rotor of the generator and determine a phase of a pulse signal generated by the pulse signal generator as a reference phase.

When control for applying the control voltage from the load side to the generator via the inverter is performed, the phase of the phase voltage of the generator coincides with the phase of the control voltage applied from the inverter. Therefore, the voltage-phase detecting means can be comprised so as to include phase-voltage zero-cross-point detecting means for detecting a zero-cross point of a phase voltage of at least one phase from timing for switching a pair of the switch elements of the inverter turned on by the controller (timing for determining respective zero-cross points of phase voltages of respective phases) and phase-angle arithmetical operation means for arithmetically operating a phase angle with respect to a reference phase at a zero-cross point detected by the phase-voltage zero-cross-point detecting means and determine the arithmetically-operated phase angle as a phase angle of the phase voltage of the at least one phase.

The voltage-phase detecting means may be comprised so as to include line-phase-voltage zero-cross-point detecting means for detecting a zero-cross point of at least one line voltage of the armature winding of the AC generator, phase-voltage zero-cross-point detecting means for arithmetically operating and detecting a zero-cross point of a phase voltage of at least one phase from the zero-cross point detected by the line-phase-voltage zero-cross-point detecting means, and phase-voltage phase-angle arithmetical operation means for arithmetically operating a phase angle with respect to a reference phase at the zero-cross point of the phase voltage of the at least one phase detected by the phase-voltage zero-cross-point detecting means and set the arithmetically-operated phase angle as a phase angle of the phase voltage of the at least one phase.

The voltage-phase detecting means may be comprised so as to include zero-cross-point detecting means for detecting a zero-cross point of voltage between an output terminal of the armature winding of the AC generator and any one of the terminals on the DC side of the inverter, phase-voltage zero-cross-point detecting means for detecting a zero-cross point of a phase voltage of at least one phase from the zero-cross point detected by the zero-cross-point detecting means, and phase-voltage phase-angle arithmetical operation means for arithmetically operating a phase angle with respect to a reference phase at the zero-cross point of the phase voltage of the at least one phase detected by the phase-voltage zero-cross-point detecting means and set the arithmetically-operated phase angle as a phase angle of the phase voltage of the at least one phase.

The current-phase detecting means may be comprised so as to include phase-current zero-cross-point detecting means for detecting a zero-cross point of a phase current of at least one phase of the AC generator and phase-current phase-angle arithmetical operation means for arithmetically operating a phase angle with respect to a reference phase at the zero-cross point detected by the phase-current zero-cross-point detecting means and set the arithmetically-operated phase angle as a phase angle of the phase current of the at least one phase.

The phase-current zero-cross-point detecting means is comprised so as to detect an electric current flowing on at least one branch of a bridge circuit comprising the inverter as at least one phase current and detect a zero-cross point of the phase current of the at least one phase.

In the present invention, since the phase of the phase voltage and the phase of the phase current of the generator are monitored, and the phase of the control voltage is controlled to cause the phase of the phase voltage to substantially coincide with the phase of the phase current of the same phase when the load voltage falls to below the target value, it is possible to perform control for bringing the load voltage close to the target value while maintaining a state where electric power given to the load from the generator is maximized within the power generation capability regardless of the parameters peculiar to the power generating apparatus such as the rotational speed of the generator, the temperature of the armature winding, and the temperature of the switch elements of the inverter.

According to the present invention, since it is possible to perform the control for bringing the load voltage close to the target value without searching through the map for giving the relation between the rotational speed of the generator and the limit delay phase of the control voltage and performing an arithmetical operation for correcting the limit delay phase of the control voltage calculated by searching through the map with respect to the temperature of the armature winding, the temperature of the switch elements of the inverter, and the like, it is possible to simplify the control.

Moreover, according to the present invention, since it is possible to reduce an arithmetical processing amount, it is possible to accurately perform control without specifically using the high-performance microprocessor. Furthermore, since it is possible to eliminate the necessity for causing the memory of the controller to store the map for limit delay phase arithmetical operation and store the parameters peculiar to the power generating apparatus, give general versatility to the controller, and improve mass-productivity, in conjunction with the fact that it is unnecessary to use the high-performance microprocessor, it is possible to realize a reduction in cost of the power generating apparatus.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF THE PREFERRED EMBODIMENTS

Preferred embodiments of the present invention are explained in detail below with reference to the accompanying drawings.

Figure 1:
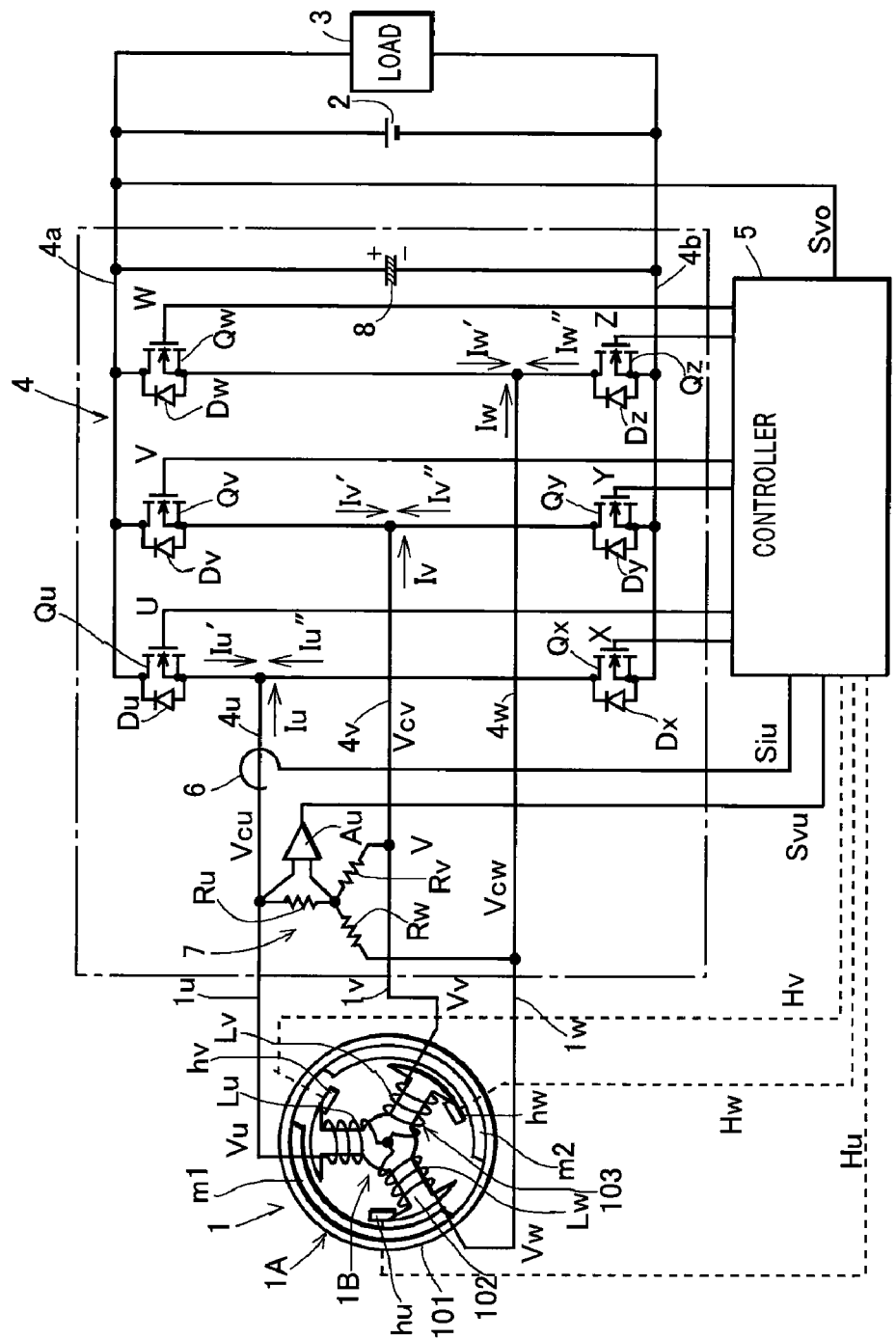
FIG. 1 is a circuit diagram of a construction of a power generating apparatus according to a preferred embodiment of the present invention.

FIG. 1 is a circuit diagram of a construction of a power generating apparatus according to a preferred embodiment of the present invention. In the figure, a reference numeral 1 denotes a magnet type AC generator driven by an engine, and 2 denotes a battery serving as voltage accumulating means. The battery is also a load of the generator. A reference numeral 3 denotes an external load connected across the voltage accumulating means 2, 4 denotes a voltage source inverter of a bridge type provided between the magnet type AC generator 1 and the voltage accumulating means 2, 5 denotes a controller that controls the inverter, 6 denotes a current detector that detects a phase current of the magnet type AC generator 1, 7 denotes a voltage detection circuit that detects a phase voltage of the magnet type AC generator 1, and 8 denotes a capacitor connected between AC side terminals of the inverter 4.

The magnet type AC generator 1 shown in the figure includes a rotor 1A fixed to a crankshaft of the engine and a stator 1B fixed to a case or the like of the engine. The rotor 1A is a well-known rotor that includes permanent magnets m1 and m2 attached to an inner circumference of a circumferential wall of a rotor yoke 101 formed in a cup-shape by a ferromagnetic material such as iron and in which a magnetic field is formed by the permanent magnets m1 and m2. Although not shown in the figure, a boss is provided in the center of a bottom wall of the rotor yoke 101 and is attached to the crankshaft of the engine.

The stator 1B includes an armature core 102 having magnetic pole sections opposed to magnetic poles of the rotor 1A and an armature winding 103 wound around the armature core. The armature winding 103 has three phase windings Lu, Lv, and Lw coupled in a star-connection and three-phase output terminals 1u to 1w are lead out from ends on opposite sides of neutral points of the respective phase windings Lu to Lw.

In this embodiment, in order to cause the magnet type AC generator to operate as a brushless motor and perform cranking of the engine in starting the same, well known hall sensors hu, hv, and hw that detect polarities of the magnetic poles of the rotor and obtain information concerning a rotational angle position of the rotor are provided on the stator 1B side with respect to the respective armature windings Lu to Lw. Position detection signals Hu, Hv, and Hw outputted by these hall sensors, respectively, are inputted to the controller 5 including a microprocessor. The position detection signals Hu to Hw are signals of a rectangular wave shape that change from a low level to a high level or from the high level to the low level every time the detected polarities of the magnetic poles change.

The inverter 4 is a voltage source inverter of a well-known three-phase bridge type including three-phase bridge-connected switch elements Qu, Qv, Qw, Qx, Qy, and Qz and feedback diodes Du, Dv, Dw, Dx, Dy, and Dz antiparallel-connected to these switch elements, respectively. The switch elements forming respective branches of a bridge circuits comprising the voltage source inverter 4 may be switch elements that have a self-turnoff ability (an ability of turning on itself when a driving signal is given thereto and turning off itself when the driving signal is removed) such as a bipolar transistor, a MOSFET, and an IGBT.

In the example shown in the figure, the respective switch elements are comprised of MOSFETs and parasitic diodes formed between drains and sources of the MOSFETs comprising the respective switch elements are used as feedback diodes. The MOSFETs comprising the switch elements Qu to Qw and Qx to Qz hold an ON state while driving signals U, V, and W and X, Y, and Z are given to gates thereof from the controller 5 and turn off themselves when these driving signals are removed.

In the inverter 4 shown in the figure, sources of the MOSFETs comprising the switch elements Qu to Qw forming an upper side of the bridge, respectively, and drains of the MOSFETs comprising the switch elements Qx to Qz forming a lower side of the bridge, respectively, are connected to each other and three-phase AC side terminals 4u to 4w are respectively drawn out from connection points of the sources of the MOSFET comprising the switch elements Qu to Qw and the drains of the MOSFETs comprising the switch elements Qx to Qz. The drains of the MOSFETs comprising the switch elements Qu to Qw, respectively, are connected in common, the sources of the MOSFETs comprising the switch elements Qx to Qz, respectively, are connected in common, and DC side terminals 4a and 4b on a plus side and a minus side are respectively drawn out from a common connection point of the drains of the MOSFETs comprising the switch elements Qu to Qw, respectively, and a common connection point of the sources of the MOSFETs comprising the switch elements Qz to Qz, respectively. The three-phase AC side terminals 4u to 4w of the inverter 4 are respectively connected to the three-phase output terminals 1u to 1w of the armature winding 102 of the magnet type AC generator 1 and the DC side terminals 4a and 4b on the plus side and the minus side are respectively connected to a plus side terminal and a minus side terminal of the battery 2.

In starting the engine, in order to rotate the rotor 1A in a direction for starting the engine, the controller 5 determines an excitation pattern of the armature windings Lu to Lw according to the position detection signals Hu to Hw obtained from the hall sensors hu to hw (according to the rotation angle position of the rotor) and gives a driving signal (a signal given to control terminals of the switch elements in order to turn on the switch elements) to any one of the switch elements Qu to Qw and any one of the switch elements Qx to Qz comprising the inverter 4 to feed an excitation current to the armature windings, which should be excited, from the battery 2 through the inverter 4. When the engine is started, the magnet type AC generator 1 is driven as a brushless motor in this way, whereby the crankshaft of the engine is rotated.

In supplying electric power from the magnet type AC generator 1 to the battery 2 and the load 3, the controller 5 controls the switch elements Qu to Qw forming the upper side and the switch elements Qx to Qz forming the lower side of the bridge of the inverter 4 at predetermined timing to be turned on for a period equivalent to 180 degrees in one cycle of AC voltage to thereby convert voltage across the battery 2 into symmetrical three-phase AC voltages Vcu, Vcv, and Vcw of a step-like waveform, a frequency of which is equal to that of an output of the magnet type AC generator, and applies the AC voltages from the inverter 4 to the armature winding 103 as control voltages. In FIGS. 2A to 2F, a waveform of the control voltage Vcu of the U phase among the three-phase control voltages is shown. When control voltage is applied to the armature winding 103 of the generator from the battery 2 through the inverter 4, a phase and a waveform of a phase voltage of the armature winding 103 are the same as a phase and a waveform of the control voltage. Therefore, the control voltage Vcu shown in the figure has a waveform of phase voltage Vu of a U phase of the magnet type AC generator 1.

In the inverter 4 shown in the figure, a three-phase diode bridge full-wave rectifying circuit is comprised of the feedback diodes Du to Dw and Dx to Dz and an AC output of the magnet type AC generator 1 is rectified by this rectifying circuit and supplied to the battery 2. When AC control voltage is applied to the armature winding 102 from the battery 2, the respective feedback diodes are used for feeding back ineffective power, which is generated because the power factor of the armature winding 103 is not 1, to the battery 2 side.

Although the voltage of a rectangular wave shape, polarities of which alternate every 180 degrees of an electric angle, is used as the control voltage in the example shown in the figure, a waveform of the control voltage is not limited to such a waveform and has only to be an AC waveform, polarities of which alternate every 180 degrees. For example, control voltage of a sine wave, polarities of which alternate every 180 degrees of an electric angle, or a distorted waveform in which a harmonic wave is added to the sine wave may be used.

Although a non-contact current sensor employing a hall effect, a current transformer, a shunt resistor, and the like can be used as the current detector 6, in the example shown in the figure, the non-contact current sensor is used as the current detector 6 in the example shown in the figure. In this embodiment, the current detector 6 is provided to detect a phase current of the U phase and a current detection signal Siu proportional to a phase current Iu of the U phase is given from the current detector 6 to the controller 5.

The voltage detecting circuit 7 includes: resistors Ru to Rw which are three-phase-star-connected and terminals on non-neutral point sides of which are connected to the three-phase output terminals 1u to 1w of the magnet type AC generator 1, respectively; and an amplifier Au to which a voltage across the resistor Ru of the U phase is inputted. In this example, with neutral points of the resistors Ru to Rw assumed as imaginary neutral points of the armature windings Lu to Lw, the voltage across the resistor Ru is detected as a phase voltage of the U phase. The voltage across the resistor Ru is inputted to the controller 5 as phase voltage detection signal Svu through the amplifier Au. Output voltage detection signal Svo proportional to the voltage across the battery 2 is also inputted to the controller 5.

Although a phase voltage is detected by connecting the resistors in a star-connection among the output terminals 1u, 1v, and 1w of the generator 1 to create the imaginary neutral points in the example shown in the figure, it is also possible that the phase voltage is calculated by an arithmetical operation from line voltages detected from the output terminals 1u, 1v, and 1w of the generator 1. The phase voltage may be detected from a voltage between at least one of the output terminals 1u, 1v, and 1w and a terminal drawn out from the neutral point of the armature winding 103.

Besides various kinds of controlling means for controlling the engine that drives the magnet type AC generator 1, control-voltage-phase controlling means for controlling a phase of the control voltage to bring voltage across the battery 2 and the load 3 to the target value is provided in the controller 5.

In the power generating apparatus shown in FIG. 1, when phases of the control voltages Vcu to Vcw of the three-phase AC waveform applied to the armature coil 103 from the battery 2 through the inverter 4 are advanced, it is possible to reduce electric power given from the generator 1 to the battery 2 and the load 3 and, when the phases of the control voltages Vcu to Vcw applied to the armature coil 103 from the battery 2 through the inverter 4 are delayed, it is possible to increase the electric power given from the generator 1 to the battery 2 and the load 3.

Therefore, after the engine is started, it is possible to keep the voltage across the battery 2 near the target value by performing control for advancing phases of control voltages Vu to Vw, which are applied to the armature coil 103 from the battery 2 through the inverter, when the voltage across the battery 2 exceeds the target value, maintaining the phases of the control voltages Vu to Vw when the voltage across the battery is substantially equal to the target value, and delaying the phases of the control voltages Vu to Vw when the voltage across the battery 2 falls below the target value.

However, when the controller 5 is caused to perform only the control described above, an output of the generator decreases to the contrary according to the delay of the control voltage when the phase of the control voltage is further delayed than the limit delay phase as explained above.

Figure 2:
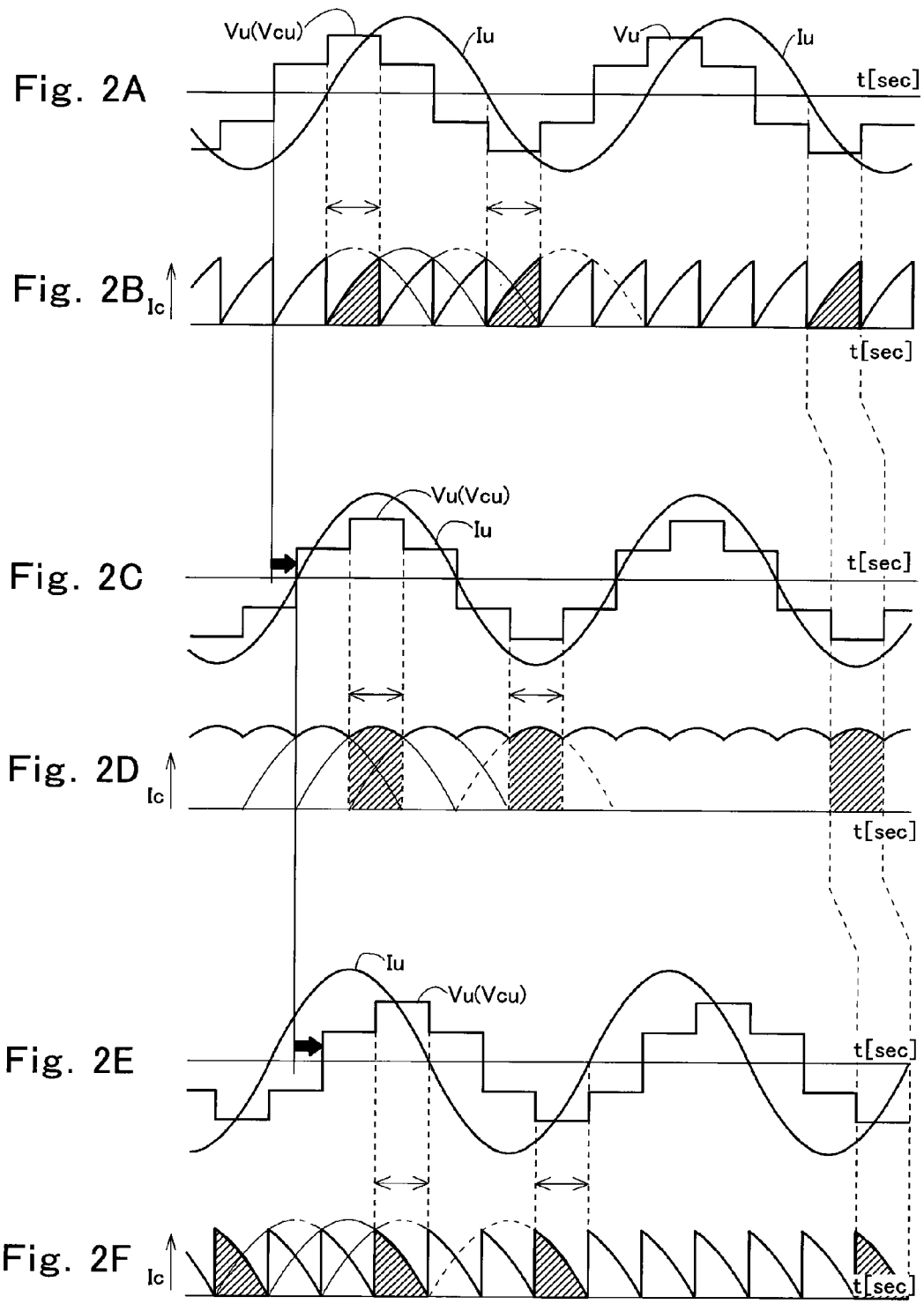
FIGS. 2A to 2F are waveform charts of a change in phases of a phase voltage and a phase current of a generator, when it is performed a control, according to a fall in battery voltage, for delaying a phase of control voltage applied to an armature coil of the generator from the battery provided on a load side of the generator through an inverter.

For example, it is assumed that the generator is operated at fixed rotational speed, and control is balanced with a phase of the phase voltage Vu advanced from a phase of the phase current Iu by a fixed angle as shown in FIG. 2A. In this case, a charging current Ic of a waveform shown in FIG. 2B flows to the battery 2. A hatched portion in FIG. 2B indicates a charging current flowing to the battery with the phase voltage of the U phase and indicates an effective current used as a charging current in the phase current Iu of the U phase.

Although only a relation between the control voltage Vcu and the phase current Iu of the U phase is shown in FIGS. 2A, 2C, and 2E, it goes without saying that three-phase control voltages are actually applied to the armature winding 103.

It is assumed that the impedance of the load 3 connected to the battery falls and a load of the generator increases in a state shown in FIG. 2A and the charging voltage of the battery 2 (the voltage across the battery 2) falls. When the phases of the control voltages Vcu to Vcw are delayed in order to increase the charging current, as shown in FIG. 2C, the phase of the control voltage Vcu becomes equal to the phase Iu of the phase current. At this point, a waveform of the charging current flowing to the battery 2 is a three-phase full-wave rectifying waveform of the case in which the power factor of the load is 1 as shown in FIG. 2D and the generator 1 gives maximum effective power within the power generation capability to the loads 2 and 3.

In the control device in prior art, when the output given from the generator 1 to the battery 2 and the load 3 is still insufficient in a state shown in FIGS. 2C and 2D, the phases of the control voltages Vcu to Vcw are further delayed. When the phases of the control voltages Vcu to Vcw are further delayed in the state shown in FIGS. 2C and 2D, as shown in FIG. 2E, the control voltage Vcu is delayed behind the phase current Iu (the phase current is advanced ahead of the phase voltage). At this point, a waveform of the charging current flowing to the battery is as shown in FIG. 2F and a portion effectively used in the phase current Iu is only a portion indicated by the hatching. When a delay amount of the control voltage increases until the control voltage becomes delayed behind the phase of the phase current in this way, according to the delay in the phase of the control voltage, the power generation output decreases and the capability of the generator cannot be utilized to the maximum. Even if the load voltage does not reach the target value, it is necessary to utilize capability of the generator to the maximum.

In order to utilize the capability of the generator 1 to the maximum, it is necessary to maintain a state where the phase of the phase voltage coincides with the phase of the phase current. Therefore, in the present invention, the voltage-phase detecting means and the current-phase detecting means for detecting a phase of a phase voltage and a phase of a phase current of the AC generator 1, respectively, are provided in the controller 5 and, in order to bring the load voltage close to the target value, the control-voltage-phase controlling means is comprised so as to advance a phase of the control voltage when the load voltage is higher than the target value, hold the phase of the control voltage in the present phase when the load voltage is equal to the target value, advance the phase of the control voltage when the load voltage is lower than the target value and a detected phase of a phase voltage is delayed behind a phase of a phase current of the same phase, and delay the phase of the control voltage when the load voltage is lower than the target value and the detected phase of the phase voltage is advanced ahead of the phase of the phase current of the same phase.

Figure 3:
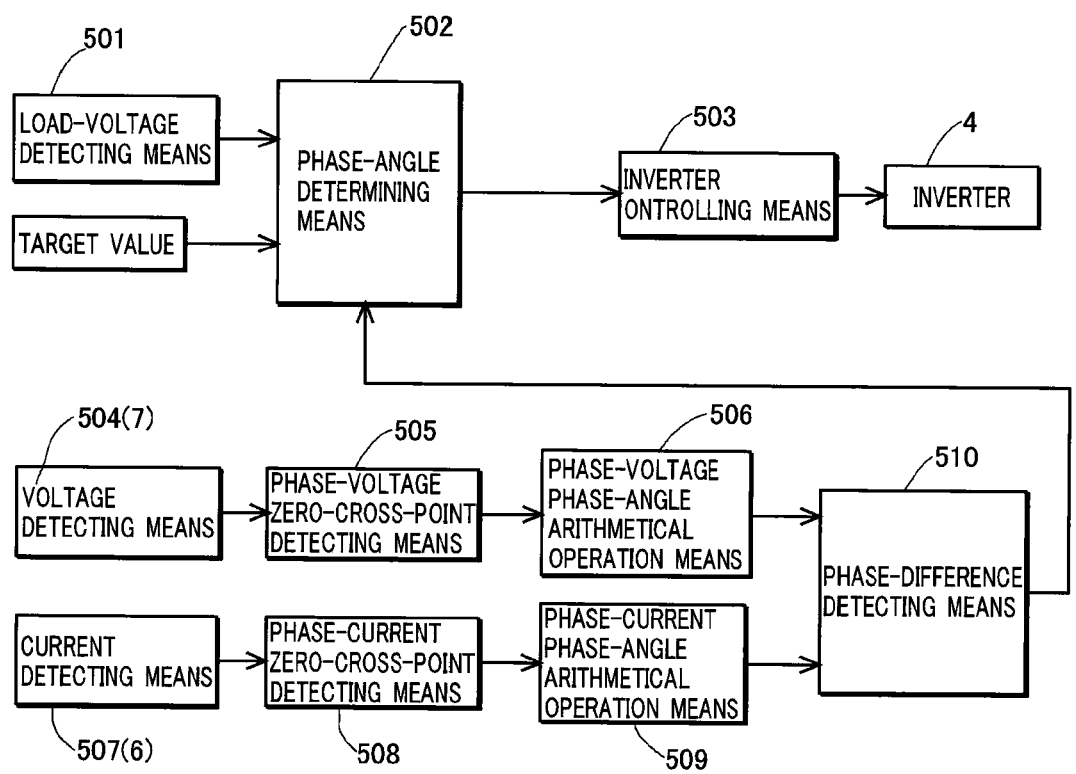
FIG. 3 is a block diagram showing a construction example of control-voltage-phase controlling means used in the embodiment.

FIG. 3 is a schematic diagram of a first construction example of a section for controlling the AC generator 1 in the construction of the controller 5 used in this embodiment and respective means shown in the figure are comprised by causing the microprocessor to execute a predetermined program. In FIG. 3, 501 denotes load-voltage detecting means for detecting the load voltage (the voltage across the battery 2 and the load 3), 502 denotes phase-angle determining means for determining a phase angle of the control voltage applied to the armature winding of the generator from the battery 2 through the inverter 4, and 503 denotes inverter controlling means for controlling the inverter 4 to generate the control voltage having the phase angle determined by the phase-angle determining means 502.

The load-voltage detecting means 501 is comprised so as to detect the load voltage by taking the voltage across the battery 2 into the microprocessor through a voltage dividing circuit and an A/D converter not shown in the figure.

A reference numeral 504 denotes voltage detecting means for detecting a phase voltage of at least one phase of the AC generator 1 or at least one line voltage. The voltage detecting means 504 used in this embodiment is comprised so as to sample, at a predetermined sampling period, a detection value of the phase voltage Vu of the U phase given from the voltage detecting circuit 7 through the A/D converter and store the detection value.

A reference numeral 505 denotes phase-voltage zero-cross-point detecting means for detecting a zero-cross-point of the phase voltage Vu by performing processing for, for example, sequentially comparing digital conversion values of the phase voltage Vu detected by the voltage detecting means 504. A reference numeral 506 denotes phase-voltage phase-angle arithmetical operation means for arithmetically operating a phase angle with respect to a reference phase at the zero-cross point of the phase voltage Vu detected by the phase-voltage zero-cross-point detecting means 504 (calculating a phase angle of a phase voltage with respect to a certain reference phase). In this embodiment, the phase angle is arithmetically operated in a form of elapsed time from timing for giving the reference phase (time data) rather than an angle between the phase angle and the reference phase.

As the zero-cross point of the phase voltage, there are a zero-cross point at the time when the phase voltage changes from a negative half wave to a positive half wave (this zero-cross point is referred to as a zero-cross point of a zero phase) and a zero-cross point at the time when the phase voltage changes from the positive half wave to the negative half wave (this zero-cross point is referred to as a zero-cross point of a π phase). If both the zero-cross point of the zero phase and the zero-cross point of the π phase are detected to monitor a phase of the phase voltage, it is possible to highly accurately detect the phase of the phase voltage and highly accurately perform the control. However, usually, it is sufficient to detect only a phase of one zero-cross point. In this embodiment, only the zero-cross point of the zero phase is detected.

Figure 4:
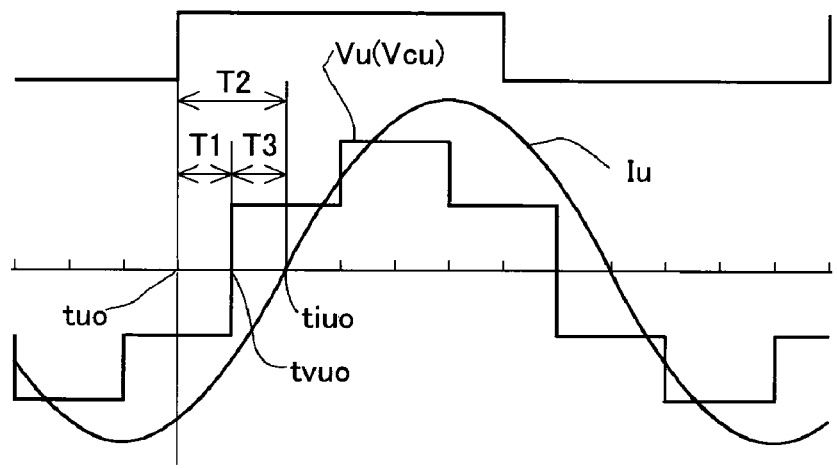
FIG. 4 is a waveform chart for explaining a method of specifying phases of a phase voltage and a phase current in the embodiment.

As shown in FIG. 4, the phase-voltage phase-angle arithmetical operation means 506 used in this embodiment detects, using timing tu0 at a rising edge of the position detection signal Hu outputted by the hall sensor hu set as a reference phase, time T1 from the timing tu0 to timing tvu0 at which the zero-cross point of the phase voltage Vu is detected, as time data for giving a phase angle of the phase voltage Vu.

A reference numeral 507 denotes current detecting means for detecting a phase current of at least one phase of the AC generator 1. The current detecting means 507 used in this embodiment is comprised so as to sample, at a predetermined sampling period, a detection value of the phase current Iu of the U phase given from the current detector 6 through the A/D converter and store the detection value.

A reference numeral 508 denotes phase-current zero-cross-point detecting means for detecting a zero-cross point of a phase current detected by the current detecting means 507 by performing processing for, for example, sequentially comparing digital values of the phase current. A reference numeral 509 denotes phase-current phase-angle arithmetical operation means for arithmetically operating a phase angle with respect to a reference phase of a zero-cross-point of the phase current Iu detected by the phase-current zero-cross-point detecting means 508 (calculate a phase angle of a phase current with respect to a reference phase same as the reference phase in calculating the phase of the phase voltage).

Figure 5:
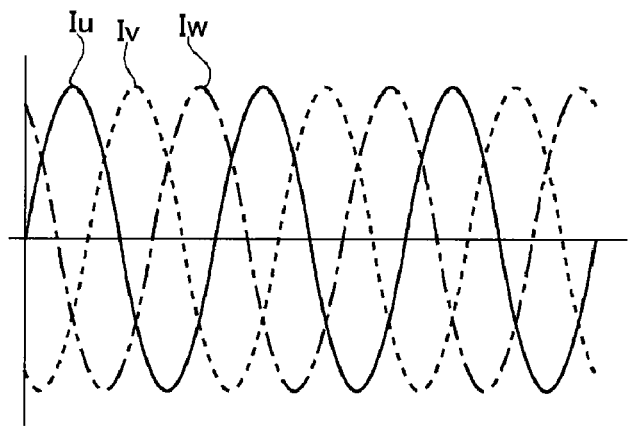
FIG. 5 is a waveform chart showing a waveform of a three-phase current flowing through an armature winding in the power generating apparatus shown in FIG. 1.

FIG. 5 is a diagram of waveforms of the three-phase phase currents Iu, Iv, and Iw flowing through the armature winding of the generator 1. Concerning the phase current, as in the phase voltage, there are a zero-cross point at the time when the phase current shifts from a negative half wave to a positive half wave (a zero-cross point of a zero phase) and a zero-cross point at the time when the phase current shifts from the positive half wave to the negative half wave (a zero-cross point in a π phase). When it is required to particularly highly accurately perform the control, it is preferable to detect both the zero-cross point of the zero phase and the zero-cross point of the π phase and detect zero-cross points of phase currents of as many phases as possible. However, usually, it is sufficient to detect one zero-cross point of a phase current of one phase. In this embodiment, only a zero-cross point of a zero phase of the phase current of the U phase is detected.

Although a phase difference between a phase voltage and a phase current of at least one phase of the AC generator 1 is calculated to control phase voltages of respective phases not to be advanced ahead of the phase current in the present invention, the voltage detecting means 504 and the current detecting means 507 do not always need to detect a phase voltage and a phase current of a phase for which a phase difference is calculated (a phase of attention) in the control. For example, even if the voltage detecting means 504 and the current detecting means 507 are comprised so as to detect a phase voltage and a phase current of a phase different from a phase of a phase voltage and a phase current for which a phase difference is calculated in the control, it is possible to estimate a phase difference between the phase voltage and the phase current of the phase of attention in the control from a phase difference between detection outputs of both the detecting means. Even when the voltage detecting means 504 and the current detecting means 507 detect phase voltages and phase currents of different phases, respectively, it is possible to calculate a phase difference between the phase voltage and the phase current of the phase of attention (the U phase in the embodiment) in the control from a phase difference calculated from zero-cross points of detection outputs of both the detecting means. For example, when the phase voltage of the U phase is controlled not to be advanced ahead of the phase current, it is possible to calculate, with an arithmetical operation, a phase difference between the phase voltage and the phase current of the U phase from a phase difference between a phase voltage of a V phase and a phase current of a W phase. For example, it is also possible to provide the voltage detecting means 504 which detects a line voltage between the W and V phases and a phase current of the U phase and the current detecting means 507 which detects a phase current of the U phase, and calculate, with an arithmetical operation, a phase difference between the phase voltage of the U phase and the phase current of the U phase from a phase difference calculated from zero-cross points of detection outputs of both the detecting means.

As shown in FIG. 4, the phase-current phase-angle arithmetical operation means 509 used in this embodiment detects, with the timing tu0 at the rising edge of the position detection signal Hu outputted by the hall sensor hu set as the reference phase, time T2 from the timing tu0 to timing tiu0 at which the zero-cross point of the phase current Iu is detected as time data for giving a phase angle of the phase current Iu.

510 denotes phase-difference detecting means for detecting a difference between a phase angle of a phase voltage arithmetically operated by the phase-voltage phase-angle arithmetical operation means 506 and a phase angle of a phase current of the same phase arithmetically operated by the phase-current phase-angle arithmetical operation means 509. The phase-difference detecting means used in this embodiment arithmetically operates a difference T2-T1 between time data T2 for giving the phase angle of the phase current of the U phase and time data T1 for giving the phase angle of the phase voltage of the U phase as phase difference time data T3 for giving a phase difference between the phase current and the phase voltage. The phase difference time data T3 is positive (T3>0) when the phase of the control voltage is advanced ahead of the phase of the phase current and the phase difference time data T3 is zero (T3=0) when the phase of the control voltage is equal to the phase of the phase current. The phase difference time data T3 is negative (T3<0) when the phase of the control voltage is delayed behind the phase of the phase current, i.e., when the phase of the phase current is advanced ahead of the phase of the phase voltage.

The phase difference between the phase voltage and the phase current detected by the phase-difference detecting means 510 is given to the phase-angle determining means 502 together with the load voltage detected by the load-voltage detecting means 501 and the target value of the load voltage. The phase-angle determining means 502 determines a phase of the control voltage to advance the phase of the control voltage by a first angle Δθ1 when the load voltage exceeds the target value, hold the phase of the control voltage in the present phase when the load voltage is equal to the target value, advance the phase of the control voltage by a second angle Δθ2 when the load voltage is lower than the target value and the phase of the phase voltage is delayed behind the phase of the phase current of the same phase, and delay the phase of the control voltage by a third angle Δθ3 when the load voltage is lower than the target value and the phase voltage is advanced ahead of the phase current of the same phase.

The first angle Δθ1 may be a fixed value or may be an angle determined according to a deviation between the load voltage and the target value of the load voltage.

The second angle Δθ2 and the third angle Δθ3 may also be fixed values or may be angles determined according to the phase difference between the phase voltage and the phase current.

In this embodiment, the voltage-phase detecting means is comprised of the voltage detecting means 504, the phase-voltage zero-cross-point detecting means 505, and the phase-voltage phase-angle arithmetical operation means 506 shown in FIG. 3 and the current-phase detecting means is comprised of the current detecting means 507, the phase-current zero-cross-point detecting means 508, and the phase-current phase-angle arithmetical operation means 509. The control-voltage-phase controlling means is comprised of the phase-difference detecting means 510, the phase-angle determining means 502, and the inverter controlling means 503.

The control-voltage-phase controlling means according to this embodiment performs control for advancing the phase of the control voltage by the first angle Δθ1 when the load voltage exceeds the target value, holding the phase of the control voltage in the present phase when the load voltage is equal to the target value, advancing the phase of the control voltage by the second angle $\Delta\theta 2$ when the load voltage is lower than the target value and the phase of the phase voltage is delayed behind the phase of the phase current of the same phase, and delaying the phase of the control voltage by the third angle $\Delta\theta 3$ when the load voltage is lower than the target value and the phase voltage is advanced ahead of the phase current of the same phase.

When the control described above is performed, the phase of the control voltage is controlled such that the phase of the phase voltage is substantially equal to the phase of the phase current of the same phase when the load voltage does not reach the target value. At this point, since the power factor of the load is kept in the state of 1, the generator 1 gives maximum power within a power generation capability determined by rotational speed thereof and charges the battery and drives the load fully utilizing the capability.

When the control described above is performed, it is possible to accurately perform the control for causing the phase of the phase voltage to substantially coincide with the phase of the phase current when the load voltage falls below the target value regardless of the parameters peculiar to the power generating apparatus such as the rotational speed of the generator, the temperature of the armature winding, and the temperature of the switch elements of the inverter. Therefore, it is possible to easily perform the control for bringing the load voltage close to the target value without searching through the map for giving the relation between the rotational speed of the generator and the limit delay phase of the control voltage and performing an arithmetical operation for correcting the limit delay phase of the control voltage calculated by searching through the map with respect to the temperature of the armature winding, the temperature of the switch elements of the inverter, and the like.

Moreover, when the control described above is performed, since an arithmetical processing amount can be reduced, it is possible to cause the controller 5 accurately perform the control even if the high-performance microprocessor is not specifically used as the microprocessor provided in the controller 5. Since it is possible to eliminate the necessity for causing the memory of the controller to store the map for limit delay phase arithmetical operation and store the parameters peculiar to the power generating apparatus, give general versatility to the controller, and improve mass productivity, in conjunction with the fact that it is unnecessary to use the high-performance microprocessor, it is possible to realize a reduction in cost of the power generating apparatus.

Figure 7:
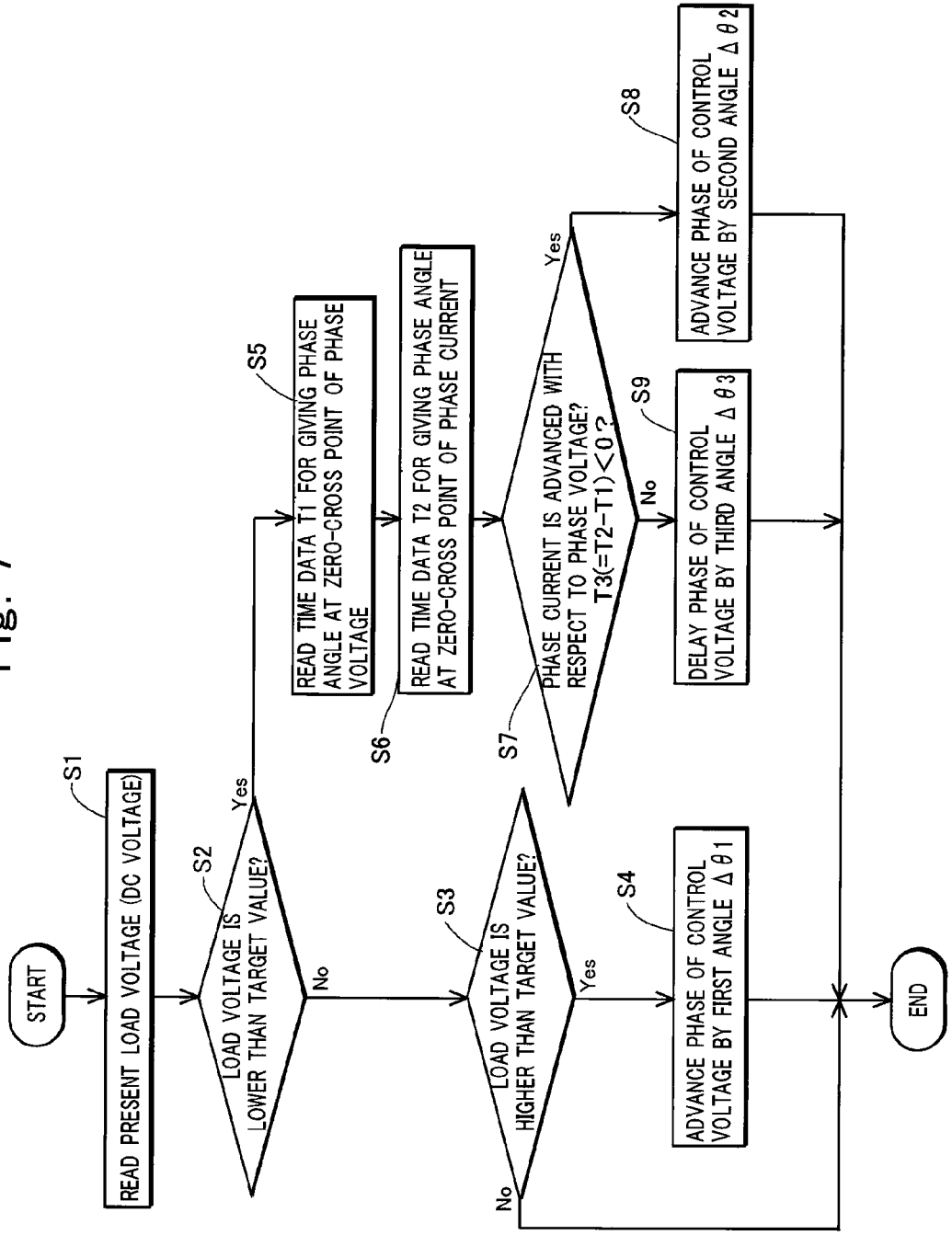
FIG. 7 is a flowchart showing an algorithm of a task executed by a microprocessor in order to configure the control-voltage-phase controlling means shown in FIG. 3.

FIG. 7 is a flowchart of an algorithm of a control voltage phase control task executed by the microprocessor in the controller 5 when electric power is supplied from the magnet type AC generator 1 to the battery 2 and the load 3. The microprocessor arithmetically operates the time data T1 and T2 for giving a phase angle with respect to reference phases of a phase voltage and a phase current every time zero-cross points of the phase voltage and the phase current are detected and causes the memory to store these time data. The time data T1 and T2 for giving the phase angles of the phase voltage and the phase current arithmetically operated anew are stored in the memory until the time data T1 and T2 for giving the phase angles of the phase voltage and the phase current is arithmetically operated next time.

The control voltage phase control task shown in FIG. 7 may be executed, in synchronization with the rotation of the generator 1, every time the timing set in advance as the timing for determining the phase angle of the control voltage is detected or may be executed at a fixed time interval asynchronously with the rotation of the generator 1.

When the task shown in FIG. 7 is started, first, in step S1, the microprocessor reads the present load voltage (the voltage across the load; in this example, the voltage across the battery 2 and the external load 3) V0 and, in step S2, judges whether the read load voltage is lower than the target value. As a result of this judgment, when it is judged that the load voltage is not lower than the target value, the microprocessor proceeds to step S3 and judges whether the load voltage is higher than the target value. As a result, when it is judged that the load voltage is higher than the target value, the microprocessor proceeds to step S4, advances the phase of the control voltage by the first angle $\Delta\theta 1$, and finishes this task.

The first angle $\Delta\theta 1$ (time data) may be a fixed value set in advance or may be a value determined according to the magnitude of a deviation between the load voltage and the target value. When the first angle $\Delta\theta 1$ is determined according to the magnitude of a deviation $\Delta V$ between the load voltage and the target value, in order to cause the load voltage to quickly converge to the target value, it is preferable to set the time data for giving the first angle $\Delta\theta 1$ to increase the first angle $\Delta\theta 1$ as the deviation is larger. When the first angle $\Delta\theta 1$ is determined according to the deviation $\Delta V$ between the load voltage and the target value, the determination of the first angle $\Delta\theta 1$ may be performed by using an empirical formula for giving a relation between the deviation $\Delta V$ and the first angle $\Delta\theta 1$ or may be performed by using a simple two-dimensional map for giving the relation between the deviation $\Delta V$ and the first angle $\Delta\theta 1$.

When it is judged in step S3 that the load voltage is not higher than the target value (the load voltage is equal to the target value), the microprocessor performs nothing thereafter (holds the phase of the control voltage in the present phase) and finishes this task.

When it is judged in step S2 that the load voltage is lower than the target value, the microprocessor proceeds to step S5 and reads a latest value of the time data T1 for giving the phase angle with respect to the reference phase at the zero-cross point of the phase voltage, and, in step S6, reads a latest value of the time data T2 for giving the phase angle with respect to the reference phase at the zero-cross point of the phase current. The microprocessor arithmetically operates a difference T3=T2−T1 between the time data T1 for giving the phase angle of the phase voltage and the time data T2 for giving the phase angle of the phase current and, in step S7, judges whether T3 is negative (whether the phase current is advanced with respect to the phase voltage). As a result, when it is judged that the phase of the phase current is advanced ahead of the phase of the phase voltage, the microprocessor proceeds to step S8, advances the phase of the control voltage by the second angle $\Delta\theta 2$, and finishes this task. When it is judged in step S7 that the phase of the phase current is not advanced ahead of the phase of the phase voltage (the phase of the current is delayed behind the phase of the phase voltage), the microprocessor proceeds to step S9, delays the phase of the control voltage by the third angle $\Delta\theta 3$, and finishes this task.

The second angle $\Delta\theta 2$ and the third angle $\Delta\theta 3$ may be fixed values set in advance or may be determined according to the phase difference between the phase voltage and the phase current. When the second angle $\Delta\theta 2$ and the third angle $\Delta\theta 3$ are determined according to the phase difference between the phase voltage and the phase current, the determination of the second angle $\Delta\theta 2$ and the third angle $\Delta\theta 3$ may be performed by using an empirical formula or may be performed by using a map.

Figure 6:
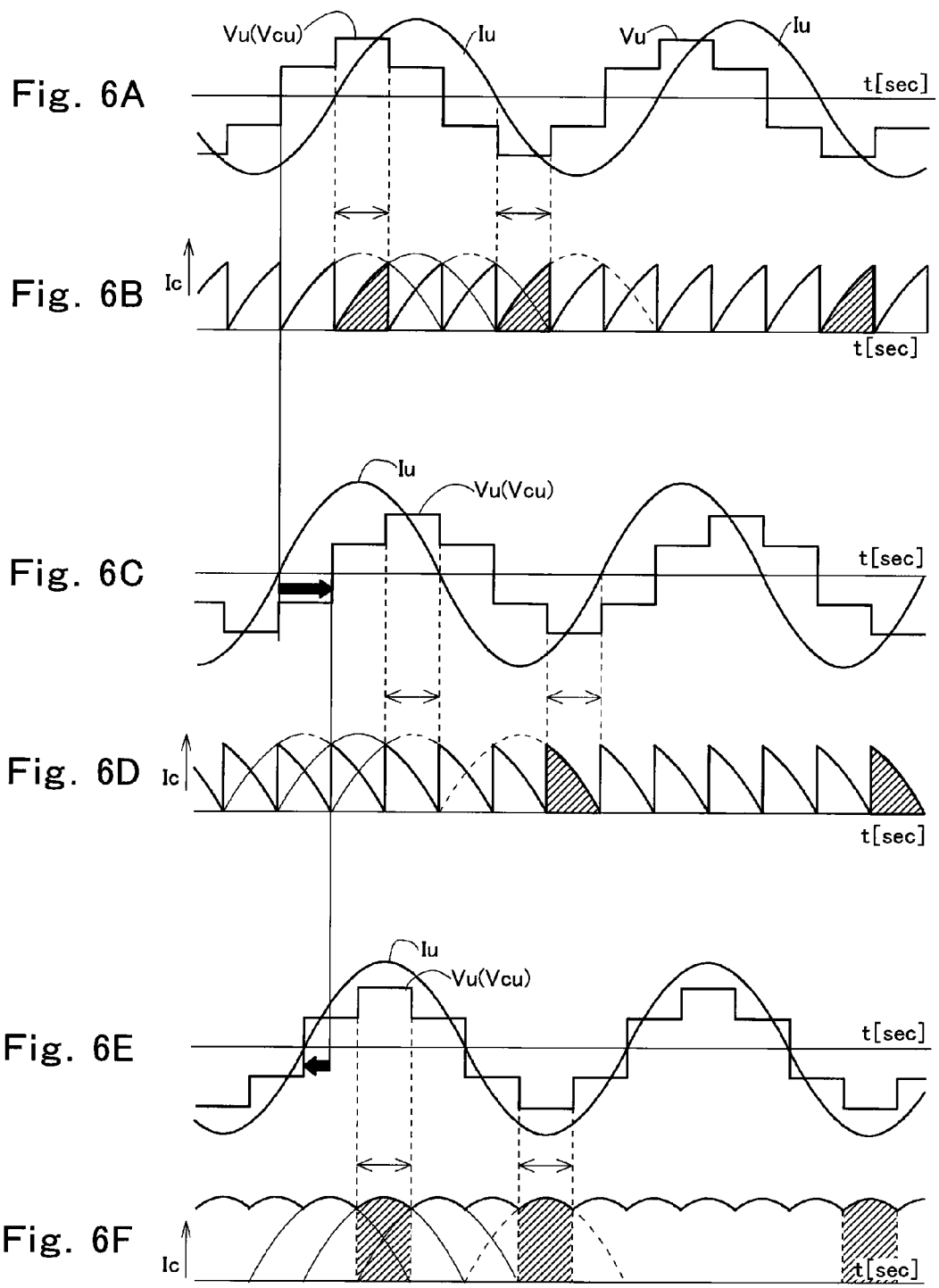
FIGS. 6A to 6F are waveform charts of a phase voltage and a phase current of the generator and a charging current of the battery used for explaining operations of the embodiment.

When the control described above is performed, if the load voltage is lower than the target value, and the phase of the phase voltage is advanced ahead of the phase of the phase current as shown in FIG. 6A in order to delay the phase of the control voltage to delay the phase of the phase voltage in step S9, the phase of the phase voltage is shifted in a direction coinciding with the phase of the phase current as shown in FIG. 6E. When the phase of the control voltage is delayed behind the phase of the phase current as shown in FIG. 6C by this control, in order to advance the phase of the control voltage to advance the phase of the phase voltage in step S8, the phase of the phase voltage is shifted in the direction coinciding with the phase of the phase current as shown in FIG. 6E. In the state where the load voltage is lower than the target value, since these kinds of control are repeated, the phase of the phase voltage is controlled to substantially coincide with the phase of the phase current. Therefore, when the impedance of the load 3 falls, the load current increases, and the load voltage cannot reach the target value, it is possible to always control the phase of the phase voltage to substantially coincide with the phase of the phase current and give maximum power from the generator 1 to the load within the power generation capability of the generator 1.

When control is balanced in a state where the maximum power is given from the generator 1 to the battery 2 and the external load 3 as shown in FIG. 6E, the temperature of the armature winding of the generator 1 rises and a resistance value thereof increases, if the phase of the control voltage is the same, the phase of the phase current is advanced relatively to the phase of the phase voltage as shown in FIG. 6C and the power given from the generator to the load decreases. In the present invention, at this point, as step S8 in FIG. 7 is executed to advance the phase of the control voltage, it is possible to perform the control for causing the phase of the phase voltage to coincide with the phase of the phase current without detecting the temperature of the armature winding and return the state shown in FIG. 6C to a state shown in FIG. 6E in which the maximum power is given from the generator 1 to the battery and the external load.

Figure 8:
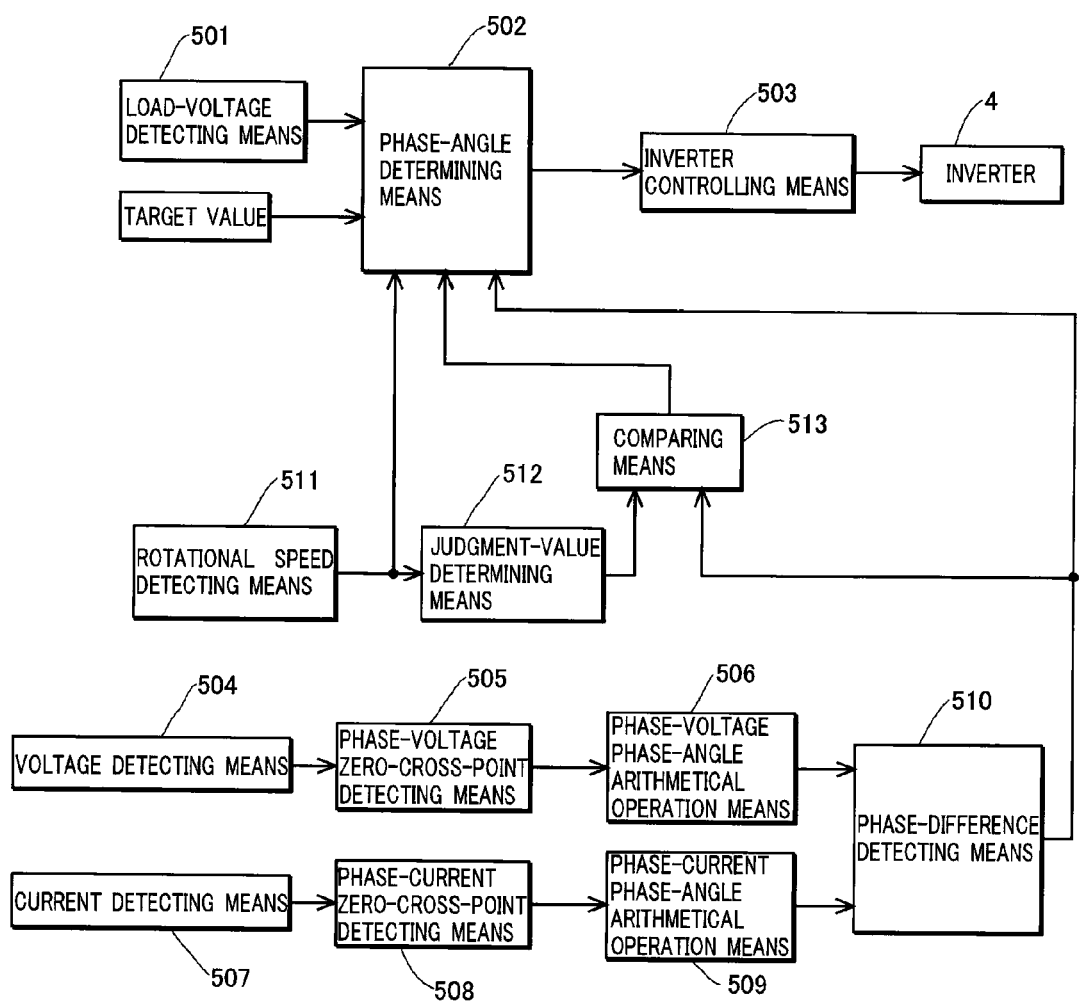
FIG. 8 is a block diagram of another construction example of the control-voltage-phase controlling means used in the embodiment.

FIG. 8 is a schematic diagram of a construction of control-voltage-phase controlling means comprised of a microprocessor in another embodiment of the present invention. In this embodiment, there are provided rotational speed detecting means 511 for detecting the rotational speed of the generator 1, judgment-value determining means 512 for determining, a judgment value to be compared with a phase difference between a phase voltage and a phase current detected by the phase-difference detecting means 510 according to the rotational speed, and comparing means 513 for comparing the phase difference between the phase voltage and the phase current detected by the phase-difference detecting means 510 with the judgment value. The rotational speed detected by the rotational speed detecting means 511, a result of the comparison by the comparing means 513, and the phase difference detected by the phase-difference detecting means are given to the phase-angle determining means 502. Otherwise, the control-voltage-phase controlling means is comprised in the same manner as the example shown in FIG. 3.

The phase-angle determining means 502 according to this embodiment determines a phase angle of the control voltage so as to perform control for advancing the phase of the control voltage by the first angle $\Delta\theta 1$ when the load voltage (the voltage across the battery 2 and the load 3) exceeds the target value, holding the phase of the control voltage in the present phase when the load voltage is equal to the target value and when the load voltage is lower than the target value and the phase difference between the phase voltage and the phase current is equal to or smaller than the judgment value, advancing the phase of the control voltage by the second angle $\Delta\theta 2$ when the load voltage is lower than the target value, the phase difference between the phase voltage and the phase current exceeds the judgment value, and the phase voltage is delayed behind the phase current, and delaying the phase of the control voltage by the third angle $\Delta\theta 3$ when the load voltage is lower than the target value, the phase difference between the phase voltage and the phase current exceeds the judgment value, and the phase voltage is advanced ahead of the phase current.

The phase angle determined by the phase-angle determining means 502 is given to the inverter controlling means 503. The inverter controlling means 503 controls the switch element of the inverter 4 to convert the voltage of the battery 2 into control voltage of a three-phase AC waveform, a frequency of which is equal to that of the induced voltage of the armature winding 103 and which has the phase angle determined by the phase-angle determining means.

As in the embodiment shown in FIG. 3, when the load voltage is lower than the target value, if the phase of the control voltage is advanced or delayed immediately after it is judged whether the phase of the phase voltage is delayed behind or advanced ahead of the phase of the phase current, since a state where the phase of the control voltage is advanced and a state where the phase of the control voltage is delayed are alternately repeated at a short period, it is likely that fine fluctuation (hunting) of a power generation output occurs. On the other hand, in this embodiment, when the load voltage is lower than the target value, it is judged whether the phase difference between the phase voltage and the phase current exceeds the judgment value and the control for advancing or delaying the phase of the control voltage is performed only when the phase difference exceeds the judgment value. Therefore, it is possible to prevent the power generation output from finely fluctuating and stably perform the control of the power generation output.

Figure 9:
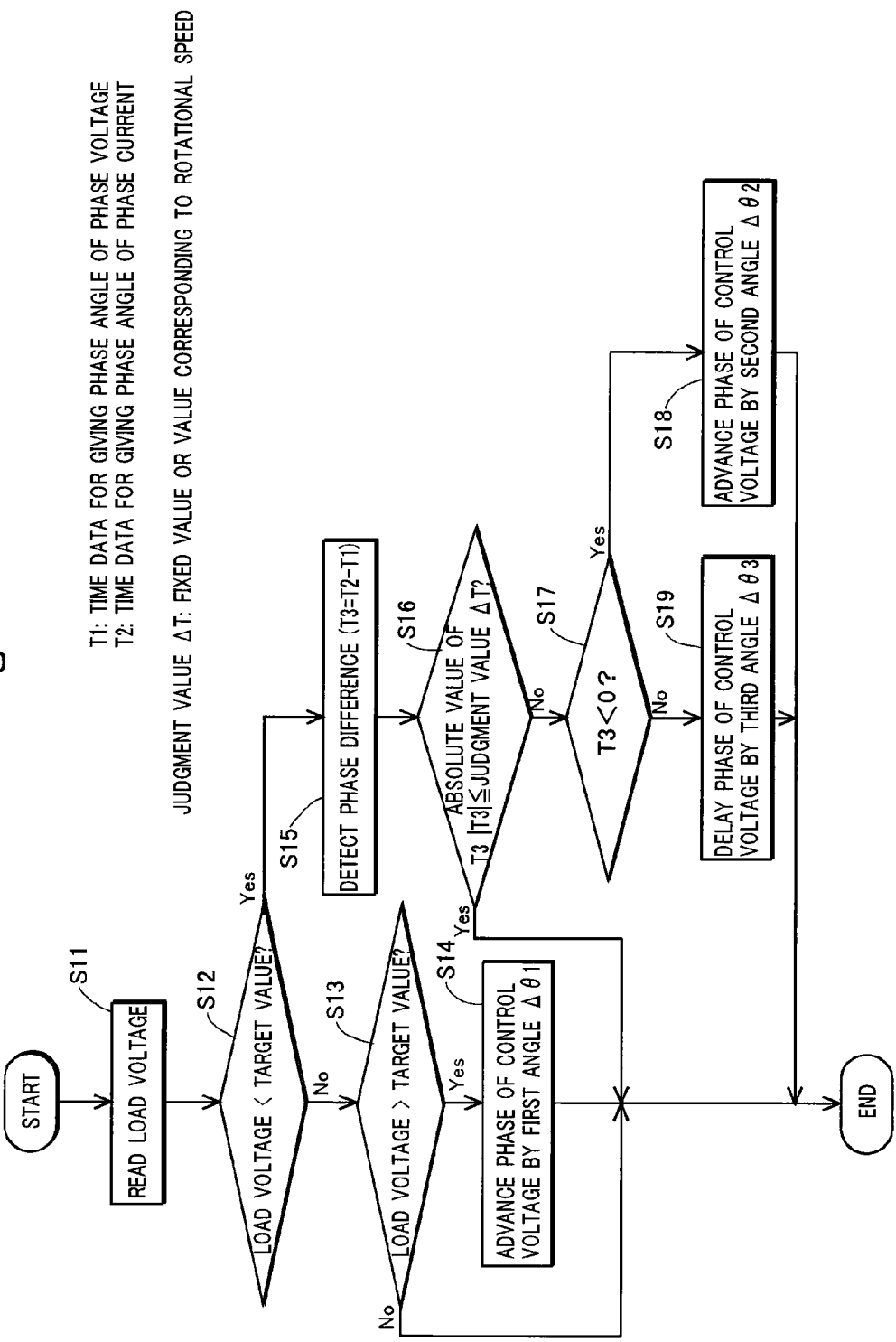
FIG. 9 is a flowchart showing an algorithm of a task executed by the microprocessor in order to configure the control-voltage-phase controlling means shown in FIG. 8.

FIG. 9 is a flowchart showing an example of an algorithm of a control voltage phase control task executed by the microprocessor to comprise the respective means shown in FIG. 8. The control voltage phase control task shown in FIG. 9 may be executed, in synchronization with the rotation of the generator 1, every time the timing set in advance as the timing for determining the phase angle of the control voltage is detected or may be executed at a fixed time interval asynchronously with the rotation of the generator 1.

When the task shown in FIG. 8 is started, first, in step S11, the microprocessor reads the present load voltage (the voltage across the battery 2 and the external load 3) V0 and, in step S12, judges whether the read load voltage is lower than the target value. As a result of this judgment, when it is judged that the load voltage is not lower than the target value, the microprocessor proceeds to step S13 and judges whether the load voltage is higher than the target value. As a result, when it is judged that the load voltage is higher than the target value, the microprocessor proceeds to step S14, advances the phase of the control voltage by the first angle $\Delta\theta 1$, and finishes this task.

The first angle $\Delta\theta 1$ (time data) may be a fixed value set in advance or may be a value determined according to the magnitude of a deviation between the load voltage and the target value. When the first angle $\Delta\theta 1$ is determined according to the magnitude of a deviation $\Delta V$ between the load voltage and the target value, the time data for giving the first angle $\Delta\theta 1$ is set to increase the first angle $\Delta\theta 1$ as the deviation is larger. The determination of the first angle $\Delta\theta 1$ may be performed by using an empirical formula for giving a relation between the deviation ΔV and the first angle Δθ1 or may be performed by using a simple two-dimensional map for giving the relation between the deviation ΔV and the first angle Δθ1.

When it is judged in step S13 that the load voltage is not higher than the target value (the load voltage is equal to the target value), the microprocessor performs nothing thereafter (holds the phase of the control voltage in the present phase) and finishes this task.

When it is judged in step S12 that the load voltage is lower than the target value, the microprocessor proceeds to step S15 and reads a latest value of the time data T1 for giving the phase angle with respect to the reference phase at the zero-cross point of the phase voltage and a latest value of the time data T2 for giving the phase angle with respect to the reference phase at the zero-cross point of the phase current and arithmetically operates phase difference time data T3=T2−T1 for giving a difference between the time data T1 for giving the phase angle of the phase voltage and the time data T2 for giving the phase angle of the phase current. Subsequently, in step S16, the microprocessor judges whether an absolute value of the phase difference time data T3 is equal to or smaller than the judgment value. As a result, when it is judged that the absolute value of the phase difference time data T3 is equal to or smaller than the judgment value, the microprocessor performs nothing thereafter and finishes this task.

When it is judged in step S16 in FIG. 9 that the absolute value of the phase difference time data T3 exceeds the judgment value, the microprocessor proceeds to step S17 and judges whether the phase difference time data T3 is negative (whether the phase current is advanced with respect to the phase voltage). As a result, when it is judged that the phase difference time data T3 is negative (the phase of the phase current is advanced ahead of the phase of the phase voltage), the microprocessor proceeds to step S18, advances the phase of the control voltage by the second angle Δθ2, and finishes this task. When it is judges in step S17 that the phase difference time data T3 is not negative (the phase of the phase current is delayed behind the phase of the phase voltage), the microprocessor proceeds to step S19, delays the phase of the control voltage by the third angle Δθ3, and finishes this task.

As in the embodiment described above, the second angle Δθ2 and the third angle Δθ3 may be fixed values set in advance or may be determined according to the phase difference between the phase voltage and the phase current. When the second angle Δθ2 and the third angle Δθ3 are determined according to the phase difference between the phase voltage and the phase current, the determination of the second angle Δθ2 and the third angle Δθ3 may be performed by using an empirical formula or may be performed by using a map.

A judgment value ΔT may be a fixed value or may be determined according to the rotational speed of the AC generator. When the phase difference between the phase voltage and the phase current is represented by time data, since the time data representing the phase difference changes according to the rotational speed even if a phase angle is the same, the judgment value ΔT is determined according to the rotational speed of the AC generator.

In the embodiment, the voltage-phase detecting means is comprised of the phase-voltage zero-cross-point detecting means for detecting a zero-cross point of at least one phase voltage of the armature winding 103 of the AC generator 1 and the phase-voltage phase-angle arithmetical operation means for arithmetically operating a phase angle with respect to a reference phase at the zero-cross point detected by the phase-voltage zero-cross-point detecting means and the arithmetically-operated phase angle is set as a phase angle of a phase voltage of at least one phase. However, the voltage-phase detecting means used in the present invention is not limited to the example described above.

For example, since the phase of the phase voltage is equal to the phase of the control voltage, the voltage-phase detecting means may be comprised so as to include control-phase-voltage zero-cross-point detecting means for detecting a zero-cross point of control voltage of at least one phase from timing for switching a combination of the switch elements of the inverter 4 and the phase-angle arithmetical operation means for arithmetically operating a phase angle with respect to the reference phase at the zero-cross point detected by the control-phase-voltage zero-cross-point detecting means and set the arithmetically-operated phase angle as the phase angle of the phase voltage of the at least one phase.

The voltage-phase detecting means may be comprised so as to include line-phase-voltage zero-cross-point detecting means for detecting a zero-cross point of at least one line voltage of the armature winding 103 of the AC generator 1, the phase-voltage zero-cross-point detecting means for detecting a zero-cross point of a phase voltage of at least one phase from the zero-cross point detected by the line-phase-voltage zero-cross-point detecting means, and the phase-voltage phase-angle arithmetical operation means for arithmetically operating a phase angle with respect to a reference phase at the zero-cross point of the phase voltage of the at least one phase detected by the phase-voltage zero-cross-point detecting means and set the arithmetically-operation phase angle as a phase angle of the phase voltage of the at least one phase.

The voltage-phase detecting means may be comprised so as to include zero-cross-point detecting means for detecting a zero-cross point of voltage between at least one of the output terminals (1u to 1w) of the armature winding of the AC generator 1 and any one of the terminals (4a and 4b) on the DC side of the inverter 4, the phase-voltage zero-cross-point detecting means for detecting a zero-cross point of a phase voltage of at least one phase from the zero-cross point detected by the zero-cross-point detecting means, and the phase-voltage phase-angle arithmetical operation means for arithmetically operating a phase angle with respect to a reference phase at the zero-cross point of the phase voltage of the at least one phase detected by the phase-voltage zero-cross-point detecting means and set the arithmetically-operated phase angle as a phase angle of the phase voltage of the at least one phase.

In this embodiment, although the current detecting means 507 is provided to detect a phase current flowing through wiring connected to the output terminals of the AC generator 1 and a zero-cross point of the phase current detected by the current detecting means is detected by the phase-current zero-cross-point detecting means 508, it is also possible that the current detecting means 507 is provided to detect an electric current flowing at least on one side of the bridge circuit comprising the inverter 4 as at least one phase current and a zero-cross point of the phase current detected by the current detecting means 507 is detected by the phase-current zero-cross-point detecting means 508.

Although a phase voltage of one phase (in the example described above, the U phase) and a phase current of one phase are detected and a phase difference between the phase voltage and the phase current is detected by the phase-difference detecting means 510 in the embodiment described above, it is also possible that phase currents and phase voltages of plural phases are detected and an average of phase differences between the phase currents and the phase voltages of the plural phases is arithmetically operated by the phase-difference detecting means 510, in order to highly accurately perform the control.

In the embodiment described above as shown in FIG. 4, with the timing of the rising edge of the position detection signal Hu outputted by the hall sensor set as the timing for giving the reference phase, a phase of the phase voltage and a phase of the phase current are calculated by measuring the time T1 from the timing to the zero-cross point of the phase voltage and the time T2 to the zero-cross point of the phase current with a timer and time data for giving a phase difference between the phase voltage and the phase current is obtained by calculating a difference between these times. However, the present invention is not limited to the case in which the phase difference between the phase voltage and the phase current is calculated by such a method.

For example, it is also possible to calculate the time data for giving the phase difference between the phase voltage and the phase current by interrupting the program executed by the microprocessor to start the timer when the zero-cross point of the phase voltage is detected and interrupting a program executed by the microprocessor to read a measurement value of the timer when the zero-cross point of the phase current is detected. This makes the hall sensor unnecessary.

Although the battery 2 as the voltage accumulating means is provided on the load side of the generator in the embodiment described above, when a battery is not provided on the load side, it is possible to apply, using a capacitor 8 connected between the DC side terminals 4a and 4b of the inverter as voltage accumulating means, the control voltage to the generator 1 from the capacitor 8 through the inverter 4. When the battery is provided on the load side as in the embodiment described above, the capacitor 8 can be omitted.

Although the preferred embodiments of the invention have been described and illustrated with reference to the accompanying drawings, it will be understood by those skilled in the art that there are by way of examples, and that various changes and modifications may be made without departing from the spirit and scope of the invention, which is defined only to the appended claims.

What is claimed is:

1. A power generating apparatus comprising:
    an AC generator that has an n-phase (n is an integer equal to or larger than 1) armature winding and outputs AC voltage;
    an n-phase voltage source inverter that includes n-phase bridge-connected switch elements and feedback diodes antiparallel-connected to said respective switch elements, AC terminal sides of which are connected to output terminals of said AC generator, and in which a load and voltage accumulating means are connected in parallel between DC side terminals; and
    a controller that controls said inverter to invert voltage across said voltage accumulating means into control voltage of an AC waveform that has a frequency equal to that of said output voltage of said AC generator and has a predetermined phase angle with respect to a reference phase set in advance and apply said control voltage to said armature winding of said AC generator,
    said controller including said voltage accumulating means and control-voltage-phase controlling means for setting the voltage across said load as load voltage and controlling a phase of said control voltage to bring said load voltage close to a target value, wherein
    said controller includes voltage-phase detecting means and current-phase detecting means for detecting a phase of a phase voltage and a phase of a phase current of said AC generator, respectively, and
    said control-voltage-phase controlling means is comprised so as to perform, in order to bring said load voltage close to said target value, control for advancing the phase of said control voltage when said load voltage is higher than said target value, holding the phase of said control voltage in a present phase when said load voltage is equal to said target value, advancing the phase of said control voltage when said load voltage is lower than said target value and the detected phase of said phase voltage is delayed behind a phase of a phase current of a same phase, and delaying the phase of said control voltage when said load voltage is lower than said target value and the detected phase of said phase voltage is advanced ahead of a phase of a phase current of the same phase.

2. The power generating apparatus according to claim 1, wherein said control-voltage-phase controlling means is comprised so as to advance the phase of said control voltage by a first angle when said load voltage exceeds said target value, hold the phase of said control voltage in the present phase when said load voltage is equal to said target value, advance the phase of said control voltage by a second angle when said load voltage is lower than said target value and the phase of said phase voltage is delayed behind a phase of a phase current of the same phase, and delay the phase of said control voltage by a third angle when said load voltage is lower than said target value and said phase voltage is advanced ahead of a phase current of the same phase.

3. The power generating apparatus according to claim 1, wherein
    said controller further includes:
    phase-difference detecting means for detecting a phase difference between a phase voltage and a phase current in the same phase from detection results by said voltage-phase detecting means and said current-phase detecting means when said load voltage is lower than said target value; and
    phase-difference judging means for comparing the phase difference detected by said phase-difference detecting means with a set judgment value and judging whether the detected phase difference is equal to or smaller than said judgment value, and
    said control-voltage-phase controlling means is comprised so as to perform control for advancing the phase of said control voltage by a first angle when said load voltage exceeds said target value, holding the phase of said control voltage in the present phase when said load voltage is equal to said target value and when said load voltage is lower than said target value and the phase difference is equal to or smaller than said judgment value, advancing the phase of said control voltage by a second angle when said load voltage is lower than said target value, the phase difference exceeds said judgment value, and said phase voltage is delayed behind said phase current, and delaying the phase of said control voltage by a third angle when said load voltage is lower than said target value, the phase difference exceeds said judgment value, and said phase voltage is advanced ahead of said phase current.

4. The power generating apparatus according to claim 3, wherein said judgment value is a fixed value.

5. The power generating apparatus according to claim 3, wherein said judgment value is determined according to a rotational speed of said AC generator.

6. The power generating apparatus according to claim 2, wherein said first angle is a fixed value.

7. The power generating apparatus according to claim 3, wherein said first angle is a fixed value.

8. The power generating apparatus according to claim 2, wherein said first angle is an angle determined according to a deviation between said load voltage and said target value.

9. The power generating apparatus according to claim 3, wherein said first angle is an angle determined according to a deviation between said load voltage and said target voltage.

10. The power generating apparatus according to claim 2, wherein said second angle and said third angle are fixed values.

11. The power generating apparatus according to claim 3, wherein said second angle and said third angle are fixed values.

12. The power generating apparatus according to claim 2, wherein said second angle and said third angle are angles determined according to a phase difference between said phase voltage and said phase current.

13. The power generating apparatus according to claim 3, wherein said second angle and said third angle are angles determined according to a phase difference between said phase voltage and said phase current.

14. The power generating apparatus according to claim 2, wherein said AC generator is a magnet type AC generator or an excitation type AC generator having magnetic field winding.

15. The power generating apparatus according to claim 2, wherein said voltage-phase detecting means is comprised so as to include phase-voltage zero-cross-point detecting means for detecting a zero-cross point of at least one phase voltage of said armature winding of said AC generator and phase-voltage phase-angle arithmetical operation means for arithmetically operating a phase angle with respect to a reference phase at said zero-cross point detected by said phase-voltage zero-cross-point detecting means and set said arithmetically-operated phase angle as a phase angle of a phase voltage of at least one phase.

16. The power generating apparatus according to claim 2, wherein said voltage-phase detecting means is comprised so as to include control-phase-voltage zero-cross-point detecting means for detecting a zero-cross point of a phase voltage of at least one phase from timing for switching a combination of said switch elements of said inverter turned on by said controller and phase-angle arithmetical operation means for arithmetically operating a phase angle with respect to a reference phase at said zero-cross point detected by said control-phase-voltage zero-cross-point detecting means and set said arithmetically-operated phase angle as a phase angle of said phase voltage of the at least one phase.

17. The power generating apparatus according to claim 2, wherein said voltage-phase detecting means is comprised so as to include line-phase-voltage zero-cross-point detecting means for detecting a zero-cross point of at least one line voltage of said armature winding of said AC generator, phase-voltage zero-cross-point detecting means for detecting a zero-cross point of a phase voltage of at least one phase from said zero-cross point detected by said line-phase-voltage zero-cross-point detecting means, and phase-voltage phase-angle arithmetical operation means for arithmetically operating a phase angle with respect to a reference phase at said zero-cross point of said phase voltage of the at least one phase detected by said phase-voltage zero-cross-point detecting means and set said arithmetically-operated phase angle as a phase angle of said phase voltage of the at least one phase.

18. The power generating apparatus according to claim 2, wherein said voltage-phase detecting means is comprised so as to include zero-cross-point detecting means for detecting a zero-cross point of voltage between an output terminal of said armature winding of said AC generator and any one of said terminals on the DC side of said inverter, phase-voltage zero-cross-point detecting means for detecting a zero-cross point of a phase voltage of at least one phase from said zero-cross point detected by said zero-cross-point detecting means, and phase-voltage phase-angle arithmetical operation means for arithmetically operating a phase angle with respect to a reference phase at said zero-cross point of said phase voltage of the at least one phase detected by said phase-voltage zero-cross-point detecting means and set said arithmetically-operated phase angle as a phase angle of said phase voltage of the at least one phase.

19. The power generating apparatus according to claim 2, wherein said current-phase detecting means is comprised so as to include phase-current zero-cross-point detecting means for detecting a zero-cross point of a phase current of at least one phase of said AC generator and phase-current phase-angle arithmetical operation means for arithmetically operating a phase angle with respect to a reference phase at said zero-cross point detected by said phase-current zero-cross-point detecting means and set said arithmetically-operated phase angle as a phase angle of said phase current of the at least one phase.

20. The power generating apparatus according to claim 15, wherein said phase-current zero-cross-point detecting means is comprised so as to detect an electric current flowing on at least one side of a bridge circuit comprising said inverter as at least one phase current and detect a zero-cross point of said phase current of the at least one phase.

\* \* \* \* \*